United States Patent
Stikan et al.

(10) Patent No.: US 11,712,726 B2
(45) Date of Patent: Aug. 1, 2023

(54) PIPE TUBULAR REINFORCEMENT FORMING MACHINE, AND RELATED METHOD

(71) Applicant: TECHNIP N-POWER, Courbevoie (FR)

(72) Inventors: Rafael Pacheco Stikan, Espirito Santo (BR); Onoraldo Soares Alves, Espirito Santo (BR); Luiz Gustavo Polez, Espirito Santo (BR)

(73) Assignee: TECHNIP N-POWER

( * ) Notice: Subject to any disclaimer, the term of this patent is extended or adjusted under 35 U.S.C. 154(b) by 0 days.

(21) Appl. No.: 16/956,628

(22) PCT Filed: Dec. 19, 2018

(86) PCT No.: PCT/EP2018/085894
§ 371 (c)(1),
(2) Date: Jun. 22, 2020

(87) PCT Pub. No.: WO2019/121948
PCT Pub. Date: Jun. 27, 2019

(65) Prior Publication Data
US 2020/0398325 A1    Dec. 24, 2020

(30) Foreign Application Priority Data
Dec. 22, 2017 (EP) .................................... 17306920

(51) Int. Cl.
*B21C 37/12* (2006.01)
(52) U.S. Cl.
CPC .................................. *B21C 37/124* (2013.01)
(58) Field of Classification Search
CPC ..... B21C 37/12; B21C 37/121; B21C 37/124; B21C 37/126; B21C 37/127; F16L 11/16; B21D 53/027
See application file for complete search history.

(56) References Cited

U.S. PATENT DOCUMENTS 3,204,666 A * 9/1965 Lindsay ................ F16L 59/153
                                                      138/135
3,487,537 A * 1/1970 Lombardi ............. B21C 37/124
                                                      228/145
(Continued)

FOREIGN PATENT DOCUMENTS

CN       104023867 A       9/2014
CN       104185515 A      12/2014
(Continued)

OTHER PUBLICATIONS

Translation, Jung et al. WO2015/121424; Aug. 2015.*
International Search Report dated Mar. 14, 2019 in corresponding PCT International Application No. PCT/EP2018/085894.
Written Opinion dated Mar. 14, 2019 in corresponding PCT International Application No. PCT/EP2018/085894.
(Continued)

*Primary Examiner* — Edward T Tolan
(74) *Attorney, Agent, or Firm* — Ostrolenk Faber LLP

(57) ABSTRACT

A machine that includes a first feeder, able to unwind a first tape; a profiler comprising an upstream profiling stage able to profile the first tape to form a pre-profiled first tape; a second feeder, able to unwind a second tape, the second tape being a flat tape. A profiler that includes an intermediate joining stage able to receive the second tape as a flat tape from the second feeder and able to join the pre-formed first tape and the flat second tape; and at least a downstream profiling stage configured to jointly profile the first tape and the second tape received from the intermediate joining stage and form a combined profiled strip.

15 Claims, 6 Drawing Sheets

(56) References Cited

U.S. PATENT DOCUMENTS

| | | | | |
|---|---|---|---|---|
| 4,081,981 A | * | 4/1978 | Lipp | B21C 37/12 |
| | | | | 72/135 |
| 4,160,312 A | * | 7/1979 | Nyssen | B21C 37/121 |
| | | | | 138/150 |
| 5,316,606 A | * | 5/1994 | Andre | F16L 58/1009 |
| | | | | 156/244.11 |
| 5,669,420 A | | 9/1997 | Herrero et al. | 138/135 |
| 9,643,226 B2 | | 5/2017 | Thompson | |
| 9,945,499 B2 | | 4/2018 | Suzuki | |
| 2016/0003381 A1 | * | 1/2016 | Kiraly | B21C 37/124 |
| | | | | 138/134 |
| 2016/0225494 A1 | * | 8/2016 | Harrington | B21F 17/00 |

FOREIGN PATENT DOCUMENTS

| | | |
|---|---|---|
| CN | 104204077 A | 12/2014 |
| CN | 106104127 A | 11/2016 |
| CN | 106956137 A | 7/2017 |
| FR | 2 555 920 A1 | 6/1985 |
| FR | 3 017 439 A1 | 8/2015 |
| WO | WO 2014/135906 A1 | 9/2014 |
| WO | 2015/121424 A1 * | 8/2015 |
| WO | WO 2015/121424 A1 | 8/2015 |

OTHER PUBLICATIONS

Extended European Search Report dated May 30, 2018 in corresponding European Patent Application No. 17306920.4.

* cited by examiner

PIPE TUBULAR REINFORCEMENT FORMING MACHINE, AND RELATED METHOD

CROSS-REFERENCE TO RELATED APPLICATIONS

The present application is a 35 U.S.C. §§ 371 national phase conversion of PCT/EP2018/085894, filed Dec. 19, 2018, which claims priority to European Patent Application No. 17306920.4, filed Dec. 22, 2017, the contents of which are incorporated herein by reference. The PCT International Application was published in the English language.

FIELD OF THE INVENTION

The present invention concerns a machine for forming a tubular reinforcement of a pipe, comprising:
- a first feeder, able to unwind a first tape;
- a profiler apparatus comprising at least an upstream profiling stage able to receive the first tape from the first feeder and to profile the first tape to form a pre-profiled first tape;
- a second feeder, able to unwind a second tape, the second tape being a flat tape.

BACKGROUND OF THE INVENTION

The pipe is preferably a flexible pipe of the unbonded type, intended for transport of hydrocarbons through a body of water, such as an ocean, a sea, a lake or a river.

Such a flexible pipe is for example manufactured according with the standards API 17J (Specification for Unbonded Flexible Pipe, 4th edition—May 2014) and API RP 17B (Recommended Practice for Flexible Pipe, 5th edition—March 2014) established by the American Petroleum Institute.

The pipe is generally formed of an assembly of concentric and superposed layers. It is considered as «unbonded» if at least one of the layers of the pipe is able to move longitudinally with respect to the adjacent layers during flexure of the pipe. In particular, an unbonded pipe is a pipe without any bonding materials connecting layers forming the pipe.

The pipe is generally positioned through a body of water, between a bottom assembly, intended to collect the exploited fluid at the bottom of the body of water and a floating or fixed surface assembly, intended to collect and distribute the fluid. The surface assembly may be a semi-submersible platform, an FPSO or another floating or fixed assembly.

In certain cases, the flexible pipe comprises an internal carcass positioned in the pressure sheath. The carcass avoids collapse of the pressure sheath, under the effect of the external pressure, for example upon depressurization of the internal passage for circulation of fluid delimited by the pressure sheath.

The internal carcass is generally formed with a profiled metal tape, wound as a spiral. The turns of the tape are interlocked to each other. The turns delimit between them a helicoidal gap radially opening inwards into the central passage for circulation of the fluid.

The internal surface of the carcass therefore axially has a succession of recesses and bumps. The pipe is then generally referred to as «rough bore».

In certain cases, the circulation of the fluid along the carcass is perturbed by the raised/recessed portions defined on the carcass by the helicoidal gap.

This flow perturbation is sometimes considered as the source of vibratory phenomena within the flexible pipe, or even, when a resonance occurs, of pulses induced by the circulation of fluid («flow induced pulsations» or «singing»).

In order to overcome this problem, it is known to manufacture flexible pipes without internal carcass. These pipes have a smooth surface («smooth bore»), but are subject to collapse in case of depressurization.

Another solution to this problem is disclosed in WO 2014/135906. In this document, the flexible pipe comprises a carcass in which the helicoidal gap present between the different turns of the carcass is closed by a S-shaped profiled tape, inserted into a profiled interlocked tape.

Such a carcass is efficient for reducing the flow induced vibrations. It is nevertheless quite complex to manufacture.

Indeed, two different profiler apparatuses are needed to profile on the one hand, the first tape forming the interlocked carcass, and on the other hand, the tape forming the S-shaped insert closing the gap of the interlocked carcass.

After profiling each tape separately, a joining apparatus is used to form a joint profiled strip which is wounded helicoidally to form the tubular reinforcement.

The machine used to form the carcass is therefore bulky and complex to use. In particular, the joining of the first profiled tape with the second profiled tape must be carried out with great precision, which requires a fine tuning of the machine.

SUMMARY OF THE INVENTION

One aim of the invention is therefore to obtain a machine able to form a tubular reinforcement for a pipe, in which the risk of vibrations and/or even of pulsations is limited, the machine being compact and easy to operate.

To this aim, the subject-matter of the invention is a machine as described above, characterized in that the profiler apparatus comprises:
- an intermediate joining stage able to receive the second tape as a flat tape from the second feeder and able to join the pre-formed first tape and the flat second tape; and
- at least a downstream profiling stage configured to jointly profile the first tape and the second tape received from the intermediate joining stage and form a combined profiled strip.

The machine according to the invention may comprise one or more of the following features, taken solely or according to any technical feasible combination:
- the intermediate joining stage comprises at least a redirecting first roller for redirection of the second tape from the second feeder to the at least one downstream profiling stage, the second tape remaining a flat tape, the intermediate joining stage comprising a second roller for supporting the pre-profiled first tape;
- each profiling stage has at least two opposite rollers defining between them a profiling interspace;
- at least a downstream profiling stage has a profiling interspace comprising at least a region for joint deformation of the first tape and of the second tape and at least a region for the deformation of only the first tape, without deformation of the second tape;
- the profiling interspace of the at least a downstream profiling stage comprises at least a region for maintaining the shape of a region of the second tape;
- the shape maintaining region is delimited, in cross section in a plane containing rotation axes of the opposite rollers, by opposite flat zones, the second tape remaining flat in the shape maintaining region;

at least one of the opposite rollers defines a lateral deforming surface for bending an edge of the first tape;

the second feeder comprises a second tape unwinder onto which the flat second tape is rolled, at least one second tape guiding roller for directing the second tape issuing from the second tape unwinder towards the intermediate joining stage;

the second feeder comprises a brake, advantageously interposed between the second tape unwinder and the intermediate joining stage, to control the feeding speed of the second tape in the intermediate joining stage;

the second feeder comprises a pair of opposed alignment rollers to guide the second tape to the intermediate joining stage with a predefined feeding direction;

the machine comprises a winding apparatus able to helicoidally wind the combined profiled strip on a cylindrical outer surface to form the tubular reinforcement;

the winding apparatus comprises a rotary support mounted rotatable around a winding axis defined by the cylindrical outer surface, the rotating table bearing the first feeder, the second feeder, and the profiler apparatus.

The invention also concerns a method for forming a tubular reinforcement for a pipe comprising the following steps:

unwinding a first tape from a first feeder;

feeding the first tape from the first feeder to at least an upstream profiling stage of a profiler apparatus to form a pre-profiled first tape;

unwinding a second tape from a second feeder, the second tape being a flat tape; characterized by:

feeding the second tape as a flat tape from the second feeder in an intermediate joining stage of the profiler apparatus and joining the pre-formed first tape and the flat second tape in the intermediate joining stage;

jointly profiling the first tape and the second tape received from the intermediate joining stage in at least a downstream profiling stage to form a combined profiled strip.

The method according to the invention may comprise one or more of the following features, taken solely or according to any technical feasible combination:

each profiling stage has at least two opposite rollers defining between them a profiling interspace, the joint profiling of the first tape and the second tape in at least a downstream profiling stage comprises jointly deforming the first tape and of the second tape in at least a region for joint deformation in the interspace and deforming only the first tape without deformation of the second tape in at least a region for the deformation of only the first tape in the interspace;

the method comprises helicoidally winding the combined profiled strip on a cylindrical outer surface to form the tubular reinforcement.

BRIEF DESCRIPTION OF THE DRAWINGS

The invention will be better understood based on the following description, given solely as an example, and made in reference to the appended drawings, in which.

DETAILED DESCRIPTION OF EMBODIMENTS OF THE INVENTION

In all the following, the terms of «outer» and «inner» are generally understood radially with respect to an axis A-A' of the pipe, the term of «outer» being understood as relatively further away radially from the A-A' and the term of «inner» extending as relatively and radially closer to the A-A' axis of the pipe.

Figure 1:
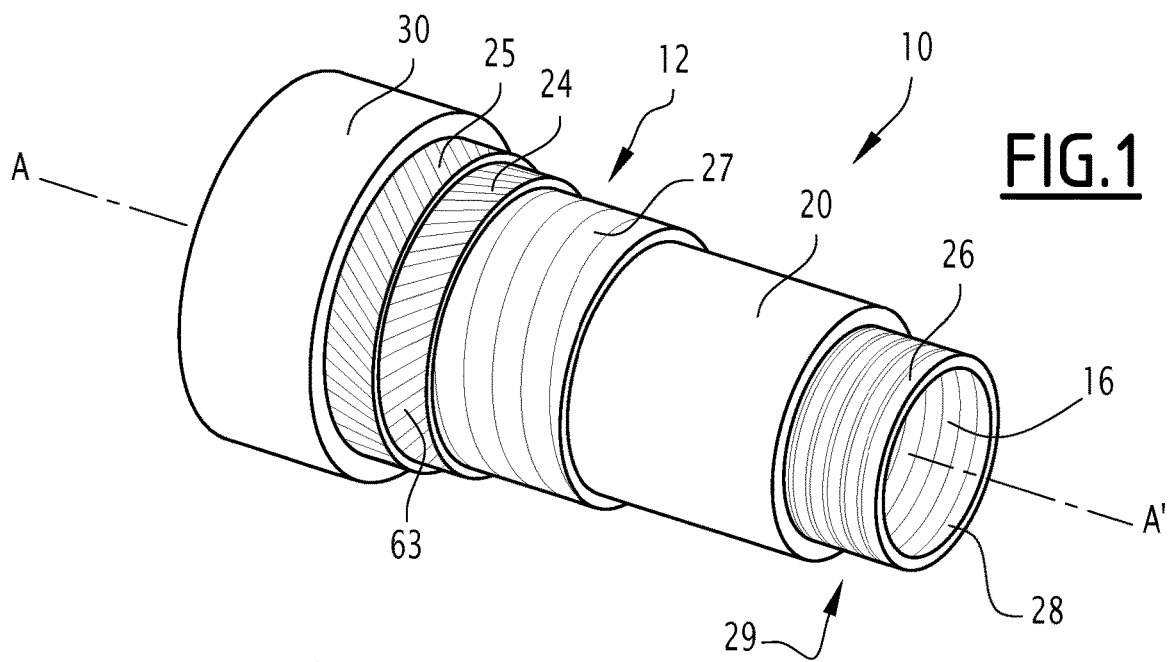
FIG. 1 is a partly cutaway perspective view of a central segment of a first flexible pipe made using a method according to the invention.

A first flexible pipe 10 is partly illustrated by FIG. 1.

The flexible pipe 10 includes a central segment 12. It includes, at each of the axial ends of the central segments 12, an end-piece (not visible).

With reference to FIG. 1, the pipe 10 delimits a central passage 16 for circulation of a fluid, advantageously a petroleum fluid. The central passage 16 extends along an axis A-A', between the upstream end and the downstream end of the pipe 10.

The central passage diameter advantageously ranges from 15 cm to 60 cm.

The flexible pipe 10 is intended to be positioned through a body of water (not shown) in an installation for exploiting fluid, in particular hydrocarbons.

The body of water is for instance a lake, a sea, or an ocean. The depth of the body of water perpendicular to the surface facility is typically between 15 m and 3000 m.

The surface facility is for example a surface base, a semisubmersible platform, a floating vertical column, an offloading buoy or a vessel such as an FPSO («Floating Production, Storage and Offloading), or a FLNG («Floating Liquefied Natural Gas).

Alternatively, the surface facility is a jacket-like fixed rigid structure or an oscillating structure secured downward of the sea, e.g. a TLP («Tension Leg Platform»).

The flexible pipe 10 is preferably an «unbonded» pipe. At least two adjacent layers of the flexible pipe 10 are free to move longitudinally with respect to each other during flexure of the pipe 10.

Advantageously, all the layers of the flexible pipe 10 are free to move relatively to each other. Such a pipe is for example described in the standardized documents API 17J (Specification for Unbonded Flexible Pipe, 4th edition—May 2014) and API RP 17B (Recommended Practice for Flexible Pipe, 5th edition—March 2014) established by the American Petroleum Institute.

As illustrated by FIG. 1, the pipe 10 delimits a plurality of concentric layers around the axis A-A', which continuously extends along the central segment 12 as far as the end pieces located at the ends of the pipe.

According to the invention, the pipe 10 includes at least one first tubular sheath 20 based on a polymeric material advantageously making up a pressure sheath.

The pipe 10 further includes at least one layer of tensile armors 24, 25 positioned exteriorly with respect to the first sheath 20 forming a pressure sheath.

The pipe 10 further includes an internal carcass 26 positioned inside the pressure sheath 20, optionally a pressure vault 27 inserted between the pressure sheath 20 and the layer(s) of tensile armors 24, 25, and an external sheath 30, intended for protecting the pipe 10.

According to the invention, the pipe 10 further includes an insert 28 having a lazy-S-shaped cross-section, the insert 28 being positioned so as to be interiorly supported on the internal carcass 26. In a variant, the insert 28 has a T-shape or a L-shape (see FIG. 11).

The internal carcass 26 and the insert 28 jointly form a tubular reinforcement 29 of the pipe 10.

In a known way, the pressure sheath 20 is intended to tightly confine the fluid transported in the passage 16. It is formed of a polymeric material, for example based on a polyolefin such as polyethylene, based on a polyamide such as PA11 or PA12, or based on a fluorinated polymer such as polyvinylidene fluoride (PVDF).

The thickness of the pressure sheath 20 is for example comprised between 5 mm and 20 mm.

Figure 2:
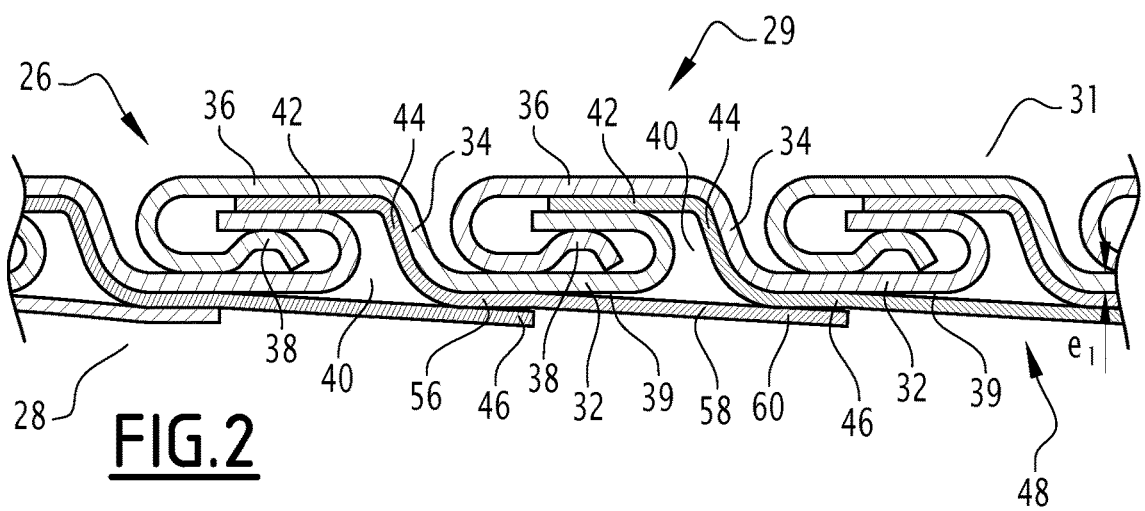
FIG. 2 is a partial sectional view along an axial midplane of a detail of the pipe of FIG. 1, illustrating the carcass and the insert positioned in the gap of the carcass.

As illustrated by FIG. 2, the carcass 26 is formed here with a first helicoidally wound profiled metal tape 31. The successive turns of the tape 31 are stapled with each other.

The tape 31 has a thickness advantageously comprised between 0.8 mm and 3.5 mm and a width advantageously comprised between 40 mm and 140 mm.

The main function of the carcass 26 is to absorb the squeezing radial forces.

The carcass 26 is positioned inside the pressure sheath 20. It is able to come into contact with the fluid circulating in the pressure sheath 20.

The helicoidal winding of the first profiled tape 31 forming the carcass 26 is with a short pitch, i.e. it has a helix angle with an absolute value close to 90°, typically comprised between 75° and 90°.

The first tape 31 has two edges longitudinally bent back on a central region. It defines a plurality of stapled turns with a closed and flattened S-shaped section, as illustrated by FIG. 2. The first tape 31 has a substantially constant thickness e1.

The closed S-shaped section of each turn of the carcass 26 successively comprises, parallel to the axis A-A' from right to left in FIG. 2, an inner U-shaped portion 32, a tilted intermediate portion 34 and an outer U-shaped portion 36, in vicinity to its free end, a supporting wave 38, commonly referred to with the term of «nipple».

The inner portion 32 of each turn of the first tape 31 is bent back towards the intermediate portion 34 away from the central axis A-A', exteriorly with respect to the tilted portion 34. It defines a U-section extending parallel to the A-A' axis and opening facing the tilted portion 34.

The distance between the two legs of the U is generally twice the thickness of the tape 31, but could be more. The length of the U legs is generally from 6 mm to 12 mm.

The angle of the titled intermediate portion 34 is generally from 10° to 20° in reference to a radial axis perpendicular to axis A-A'.

The outer portion 36 of an adjacent turn is partly engaged into the inner portion 32, the supporting wave 38 being inserted between the branches of the U.

The inner portion 32 defines an inner surface 39 located on a cylindrical envelope of axis A-A'.

The outer portion 36 also defines a U section extending parallel to the A-A' axis and opening facing the tilted portion 34.

The outer portion 36 of each turn is bent back towards the intermediate portion 34, towards the central axis A-A', interiorly with respect to the tilted portion 34. The outer portion 36 and the supporting wave 38 of the section are received into the inner portion 32 of an adjacent section, and partly covering outwards the inner portion 32 of the adjacent section.

The width and the length of the supporting wave 38 is generally from 1 mm to 5 mm For each turn, the intermediate portion 34, the outer portion 36 and the inner portion 32 of an adjacent section delimit an inner gap 40, partly or completely defining the axial play of the carcass 26.

The gap 40 radially opens towards the central axis A-A'. For each turn, it opens interiorly towards the axis A-A' between the inner surfaces 39 of the inner portions 32 of two adjacent turns.

Exteriorly, the gap 40 is closed by the outer portion 36 and laterally by the intermediate portion 34 of a turn and by the inner portion 32 of an adjacent turn.

The gap 40 thus continuously extends as a helix of axis A-A', according to a pitch P1 along the carcass 26.

Each turn of the carcass 26 has a width advantageously comprised between 25 mm and 100 mm.

The carcass 26 has, between each pair of stapled turns, a first axial play defined by the relative sliding axial travel of the outer portion 36 of a turn in the inner portion 32 of an adjacent turn into which it is engaged.

The insert 28 is partly positioned in the gap 40 and closes the gap 40 towards the axis A-A'.

The insert 28 thus advantageously has a helicoidal shape of axis A-A', with a pitch P1 similar to the pitch of the gap 40.

Figure 3:
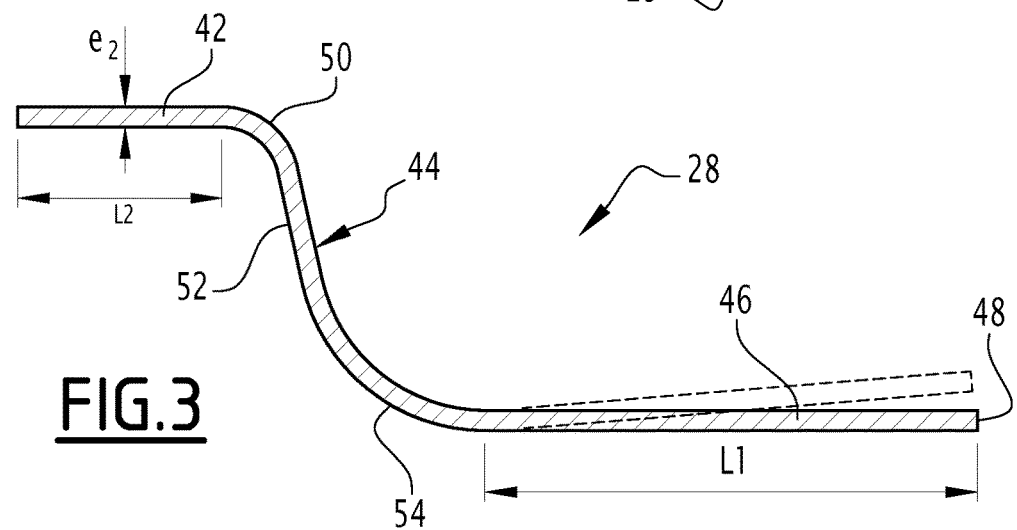
FIG. 3 is a view of a detail of FIG. 2, illustrating a lazy-S-shaped section of the insert.

As illustrated by FIG. 3, the insert 28 has a section, taken in a axial midplane, of a lazy-S-shape.

It includes an axial outer region 42, a radial intermediate region 44 and an axial inner region 46 protruding from the intermediate region 44, axially opposite to and radially away from the axial outer region 42, The axial inner region 46 at least partly closes the gap 40. Advantageously, the axial inner region 46 completely closes the gap 40.

According to the invention, the insert 28 is made in a single piece by bending a second tape 48.

The second tape 48 is preferably metal. It advantageously has a constant thickness e2. The thickness e2 of the second tape 48 is preferably less than the thickness e1 of the first tape 31. The thickness e2 of the second tape 48 is advantageously comprised between one-third and two-thirds of the thickness e1 of the first tape 31.

The thickness e2 is for example comprised between 0.5 mm and 2 mm, in particular between 0.8 mm and 1.5 mm.

Such a thickness guarantees sufficient stiffness, while limiting the risk of disorganization when a probe in introduced into the central passage 16 ("pigging" operations).

In the example illustrated in FIG. 2 and FIG. 3, the outer region 42 extends over a cylindrical envelope of central axis A-A'.

The outer region 42 is clamped between the outer branch of the U of the outer portion 36 of a turn of the carcass 26 and the outer branch of the U of the inner portion 32 of an adjacent turn of the carcass 26. It is applied against the inner surface of the outer portion 36.

As illustrated by FIG. 3, the intermediate region 44 comprises a curved connecting outer segment 50 with the outer region 42, an intermediate segment 52 with a linear section, and a curved inner segment 54 connected with the inner region 46.

The outer segment 50 has a convexity curvature directed outwards. The radius of curvature of the outer segment 50 is advantageously greater than the thickness e2 of the second tape 48.

The intermediate segment 52 extended in a tilted way with respect to an axis perpendicular to the central axis A-A', while being axially located away from the outer segment 42 and from the inner segment 46.

The inner segment 54 has a curvature of convexity which is directed inwards, opposite to the convexity of the curvature of the outer segment 50. It has a radius of curvature greater than the radius of curvature of the outer segment 50.

The intermediate region 44 is applied on an inner surface of the intermediate portion 34. It has a shape complementary to the shape of the intermediate portion 34.

The intermediate region 44 is positioned in the gap 40 between the intermediate portion 34 and the outer portion 36 of a turn of the carcass 26, and the inner portion 32 of an adjacent turn of the carcass 26.

The outer region 42 axially protrudes from the outer segment 50 of the intermediate region 44.

The inner region 46 also extends axially along the axis A-A', over a cylindrical envelope of A-A' or with an angle of less than 10° with respect to this envelope.

Preferably, the inner region 46 is elastically urged towards a tilted position with respect to the cylindrical envelope of axis A-A', directed outwards, as illustrated in thin lines in FIG. 3, when it is positioned on a cylindrical envelope of axis A-A'.

Figure 11:
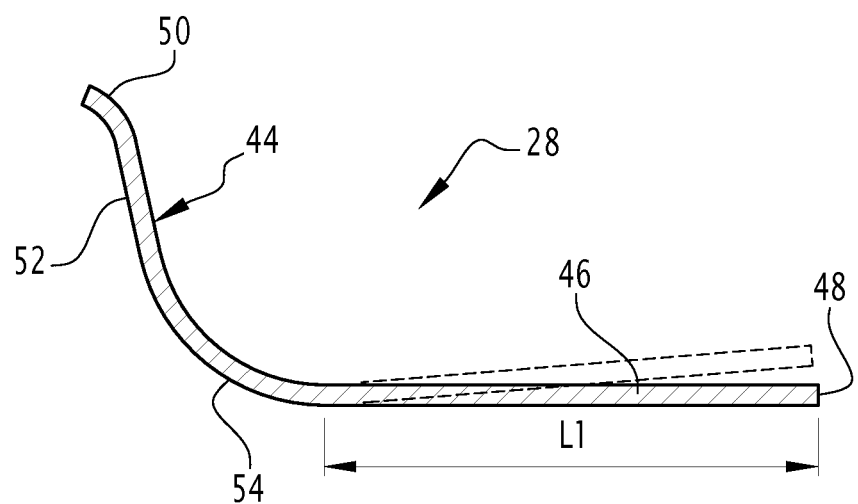
FIG. 11 is a view similar to FIG. 3, illustrating an alternate L-shaped section of the insert.

The width L1 of the inner region 46, taken along the axis A-A' is greater than the width L2 of the outer region 42, taken along the axis A-A'. In the variant of FIG. 11 in which the insert 28 has a L-shape, the insert 18 does not comprise an outer region 42.

The inner region 46 axially extends opposite to the outer region 42 with respect to the intermediate region 44, and radially away from the latter.

It protrudes from the inner segment 54 of the intermediate region 44.

With reference to FIG. 2, the inner region 46 of each turn of the insert 28 includes a first axial segment 56 applied on the inner surface 39 of the inner portion 32 of a turn of the carcass 26, an axial intermediate segment 58 closing inwards the gap 40 delimited by the inner portion 32, and a second axial segment 60 applied on an inner surface of the inner region 46 of an adjacent turn of the insert 28, at the first axial segment 56 of this inner region 46.

The inner region 46 of each turn of the insert 28 is advantageously maintained applied against the inner surface of the inner region 46 of a turn of the insert 28, by elastically urging the inner region 46 outwards.

Thus, the successive turns of the insert 28 overlap each other by their inner regions 46, in order to close the gap 40 inwards.

The overlapping width of each inner region 46, when the carcass 26 occupies a non-deformed linear configuration is greater than the axial play of the carcass 26.

With reference to FIG. 1, the pressure vault 27 is intended to absorb the forces related to the pressure prevailing inside the pressure sheath 20. For example it is formed with a helicoidally wound metal profiled wire around the sheath 20. The profiled wire generally has a complex geometry, in particular Z-shaped, T-shaped, U-shaped, K-shaped, X-shaped or I-shaped.

The pressure vault 27 is helicoidally wound with a short pitch around the pressure sheath 20, i.e. with a helix angle of an absolute value close to 90°, typically comprised between 75° and 90°.

The flexible pipe 10 according to the invention comprises at least one layer of armors 24, 25 formed with a helicoidal winding of at least one elongated armor element 63.

In the example illustrated in FIG. 1, the flexible pipe 10 includes a plurality of layers of armors 24, 25, in particular an inner layer of armors 24, applied on the pressure vault 27 and an outer layer of armors 25 around which is positioned the outer sheath 30.

Each layer of armors 24, 25 includes longitudinal armor elements 63 wound with a long pitch around the axis A-A' of the pipe.

By "wound with a long pitch", is meant that the absolute value of the helix angle is less than 60°, and is typically comprised between 25° and 55°.

The armor elements 63 of a first layer 24 are generally wound according to an opposite angle with respect to the armor elements 63 of a second layer 25. Thus, if the winding angle of the armor elements 63 of the first layer 24 is equal to +a, a being comprised between 25° and 55°, the winding angle of the armor elements 63 of the second layer of armors 25 positioned in contact with the first layer of armors 24 is for example equal to $-\alpha°$.

The armor elements 63 are for example formed with metal wires, in particular steel wires, or with strips in composite material, for example strips reinforced with carbon fibers.

The external sheath 30 is intended to prevent permeation of fluid from the outside of the flexible pipe 10 towards the inside. It is advantageously made in a polymeric material, in particular based on a polyolefin, such as polyethylene, or on the basis of a polyamide, such as PA11 or PA12.

The thickness of the external sheath 30 is for example comprised between 5 mm and 15 mm.

The tubular reinforcement 29 comprising the carcass 26 and the insert 28 is manufactured in a machine 100 according to the invention, shown in FIGS. 4 to 10.

The machine 100 comprises a central mandrel 102 defining an outer tubular surface 104 for supporting and shaping the tubular reinforcement 29. It comprises a rotary support 106 mounted rotary around a winding axis E-E' of the central mandrel 102, and a profiling device 108 borne by the rotary support 106 to be jointly moved in rotation with the rotary support 106.

The profiling device 108 comprises a profiler apparatus 110, a first feeder 112 for feeding the flat first tape 31 to the profiling apparatus 110 to form a pre-profiled first tape 31, and a second feeder 114 for feeding the flat second tape 48 to the profiler apparatus 110 and have the second tape 48 being jointly profiled with the pre-profiled first tape 31 to form a combined profiled strip 196 to be wound on the outer tubular surface 104.

The profiling device 108 also comprises a locking device 115 able to close and interlock the successive turns of the combined profiled strip 196.

In this example, the central mandrel 102 directly defines the outer surface 104 around which the tubular reinforcement 29 is wound.

In this example, the central mandrel 102 is formed by a metal tube defining the outer surface 104.

In a variant (not shown), the outer surface 104 is defined onto a tubular sheath of the pipe.

The rotary support 106 is here formed by a circular table. The rotary support 106 defines a front face 116 and a back face 118 opposed to the front face 116. It delimits, between the front face 116 and the back face 118, a central through passage 120 through which the mandrel 102 extends.

The rotary support 106 is able to rotate with regards to the outer surface 104 around the winding axis E-E', to allow the winding of successive turns of the tubular reinforcement 29 with a helical shape. The tubular reinforcement formed on the outer surface 104 is able to slide on the outer surface 104 along the axis E-E'.

As indicated above, the profiling device 108 is borne by the rotary support 106 to be rotated jointly with the rotary support 106. The profiler apparatus 110 comprises at least one, preferentially a plurality of upstream profiling stages 122A to 122G, at least an intermediate joining stage 124, and at least one, preferentially a plurality of joint profiling stages 126A to 126C for jointly profiling the first tape 31 and the second tape 48.

The profiler apparatus 110 further comprises a common support body 128 bearing the upstream profiling stages 122A to 122G, the joining stage 124 and the downstream profiling stages 126A to 126C. It comprises a displacement device 129 of the common support body 128 on the rotary support 106.

The upstream profiling stages 122A to 122G, the joining stage 124, and the downstream profiling stages 126A to 126C, each comprise a pair of opposite rollers 130, 132 defining between them an profiling interspace 134.

The rollers 130, 132 are rotatably mounted around rotation axes parallel to each other and parallel to the winding axis E-E'. The rollers 130, 132 respectively define rows on the common support body 128. The interspaces 134 between the respective rollers 130, 132 are preferably aligned along a profiling axis F-F' perpendicular to the winding axis E-E'.

The rollers 130, 132 advantageously have an average diameter ranging from 10 cm to 30 cm.

The upstream profiling stages 122A to 122G are configured to receive the flat first tape 31 from the first feeder 112 and to form a pre-profiled first tape 31 by deformation of at least a region of the flat first tape 31 to generate a cross section distinct from the cross section of the flat first tape 31.

They comprise at least one stage 122A, 122B for forming the intermediate portion 34 of the first tape 31, at least a stage 122C for forming the supporting wave 38 and several stages for pre-bending the edges of the first tape 31 to form the inner portion 32 and the outer portion 36 of the first tape 31.

Figure 5:
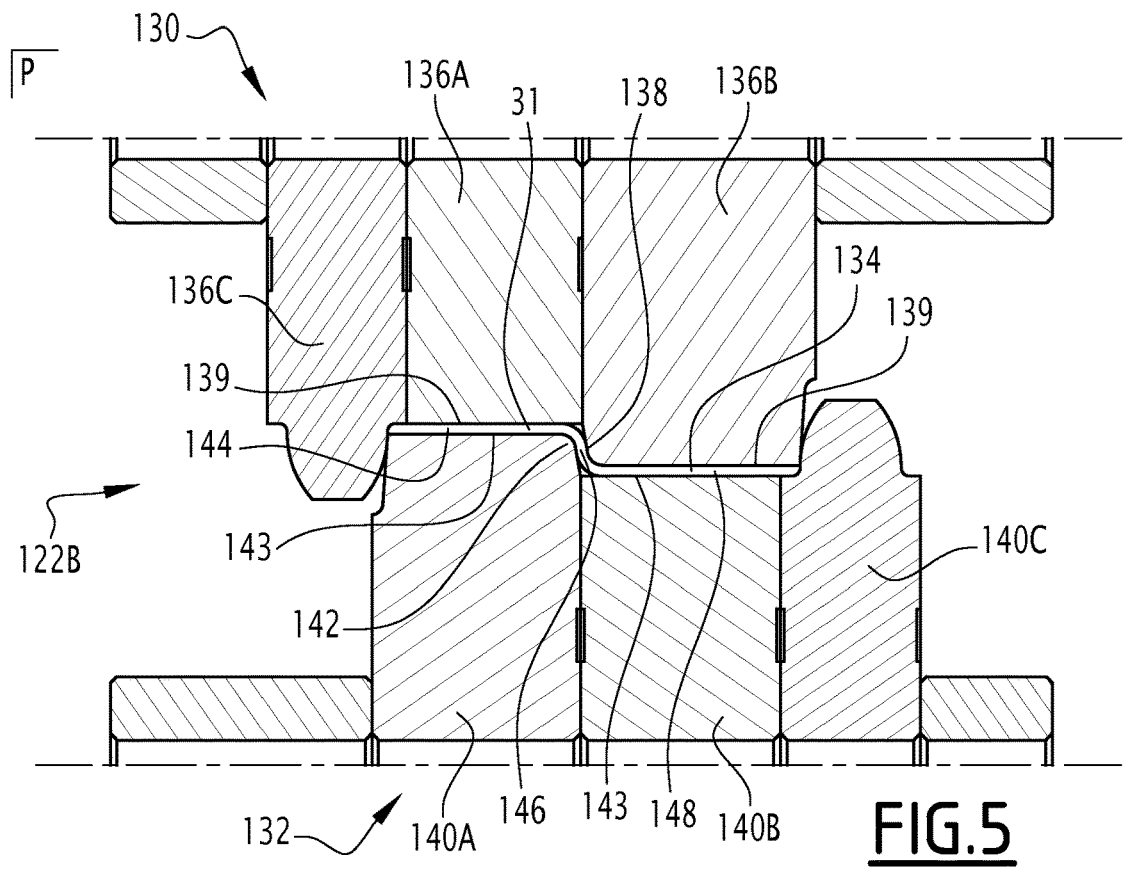
FIGS. 5 to 7 are cross-sectional views of profiling rollers of successive upstream profiling stages of a first tape in the machine of FIG. 3.

The stage 1228 for forming the intermediate portion 34 of the first tape 31 is shown in FIG. 5. In cross section in a plane P joining the rotation axes of the rollers 130, 132, the first roller 130 defines at least an inclined step 138 between two flat zones 139 parallel to the rotation axis.

In this example, the roller comprises two disc 136A, 136B defining the step 138, and a first lateral disc 136C for positioning a first lateral edge of the first tape 31 and for laterally closing the interspace 134 on a first side.

In the plane P, the second roller 132 also defines a step 142 between two flat zones 143 parallel to the rotation axis. Step 142 is positioned facing and apart from step 138. The flat zones 139, 143, are facing each other, apart from each other.

In this example, the roller 132 comprises two discs 140A, 140B defining the step 142 and a lateral disc 140C for positioning a second lateral edge of the first tape 31 and for laterally closing the interspace 134 on a second side.

The interspace 134, taken in section in a plane containing the axis of rotations of both rollers 130, 132 comprises a first and second flat regions 144, 148 defined between respective flat zones 139, 143, and between the flat regions 144, 148, an intermediary stepped region 146 defined between steps 138, 142.

Figure 6:
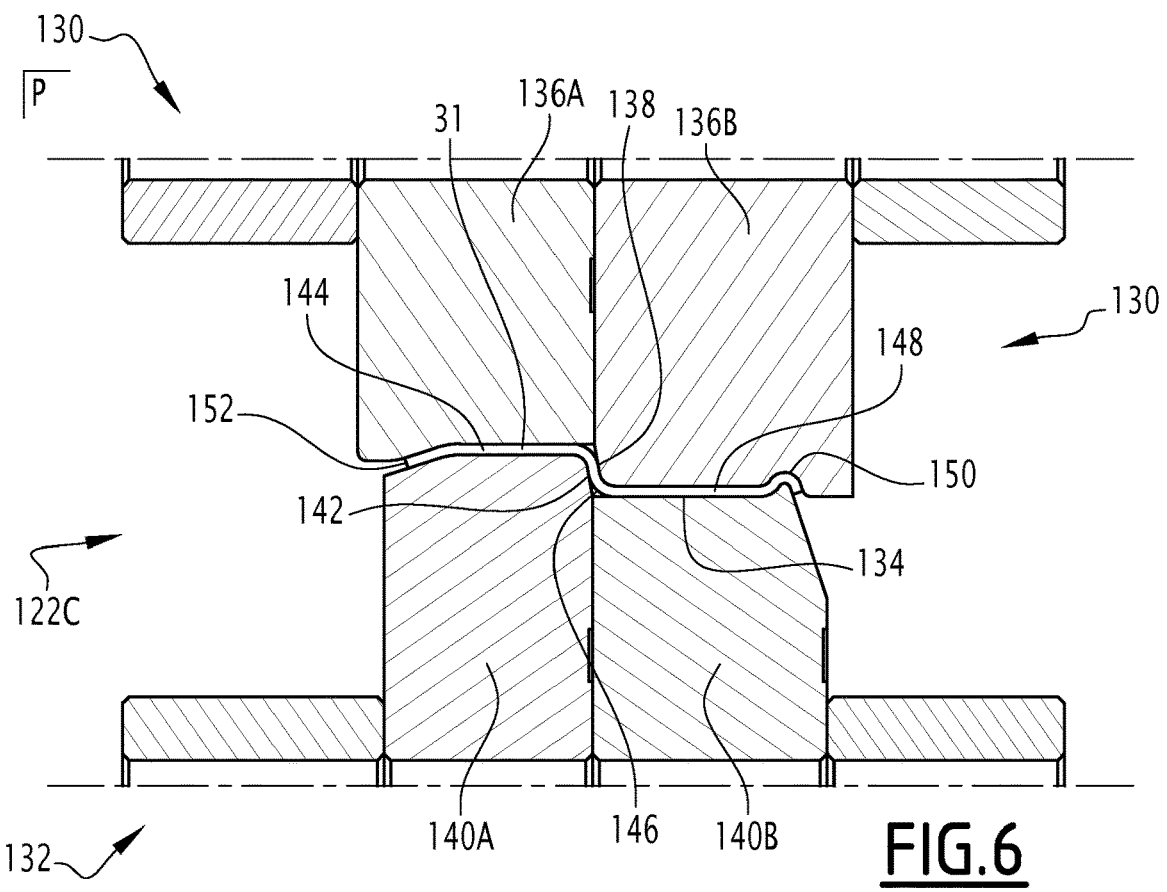

In a further upstream preforming stage 122C, shown in FIG. 6, the roller 130 defines a circumferential groove 150 to form the supporting wave 38. The groove 150 is here made on a side of disc 136B.

The interspace 134 also comprises on a side of the rollers 130, 132 an inclined region 152 to initiate the bending of the first tape 31 along the first lateral edge.

The inclined region 152 is here defined between a protruding zone of the first roller 130 and a corresponding recessed zone of the second roller 132.

The stage 122C does not comprise lateral discs 136C, 140C.

In a further upstream preforming stage 122F, the first roller 130 comprises a lateral annular protrusion 154 for continuing the bending of the first lateral edge of the first tape 31. The protrusion 152 has a curved concave surface extending along a curved convex lateral surface of the second roller 132. The protrusion 154 is here formed on disc 136A.

The second roller 132 also comprises a lateral annular protrusion 156 for partially deforming the second lateral edge of the first tape 31 comprising the supporting wave 38. The protrusion 156 has a curved concave surface extending along a curved convex lateral surface of the first roller 130. The protrusion 156 is here formed on disc 140B.

The curved concave surfaces are able to bend the sides of the first tape 31 with an angle greater than 45°, in particular greater than 80° with regards to the flat regions 144 of the interspace 134.

Figure 8:
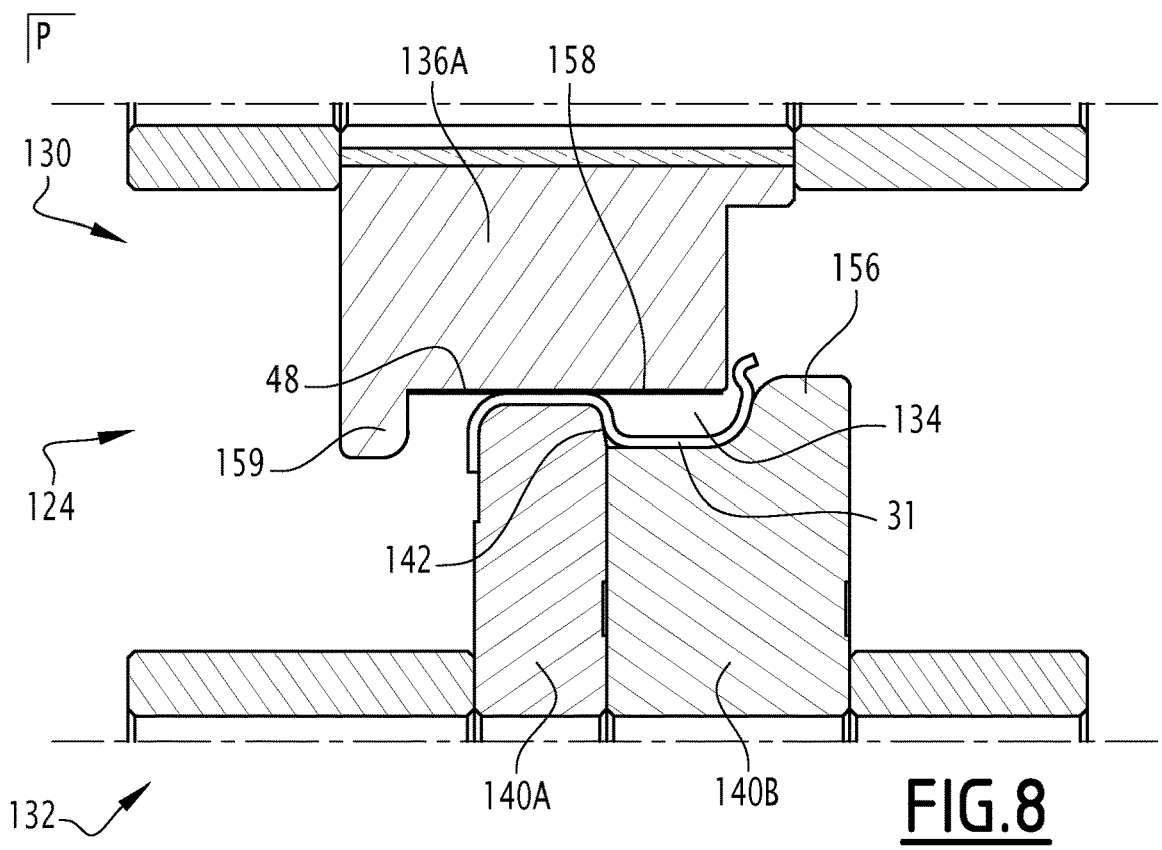
FIG. 8 is a view similar to FIG. 5 of the intermediate joining stage of the machine of FIG. 3 for joining the pre-profiled first tape and a second flat tape.

As shown in FIG. 8, in the intermediate joining stage 124, the first roller 130 is a guiding roller configured for redirecting the second tape 48 from the second feeder 114 to the downstream profiling stage 126A to 126C, the second tape 48 remaining a flat tape.

The first roller 130 defines, in cross section in the plane P, a flat zone 158 for deflection without deformation of the second tape 48. The flat zone 158 is advantageously delimited on one side by a positioning protrusion for abutting an edge of the flat second tape 48.

The flat zone 158 is able to redirect the second tape 48 from the second feeder 114 into a direction parallel to the profiling axis F-F'. The second tape 48 remains flat when it is deflected by the first roller 130. It has the same cross section before and after passing the first roller 130.

Advantageously, the first roller 130 is mounted freely rotatable around its axis, without being driven.

In the intermediate joining stage 124, the second roller 132 has a shape similar to the second roller of upstream preforming stage 122F to support the preformed first tape 31, facing the flat zone 158, in contact with the second tape 48 or at a short distance of the second tape 48, for example at a distance smaller than the thickness of the second tape 48.

The preformed first tape 31 and second tape 48 are therefore joined, by being placed with their longitudinal local axis parallel to each other. The preformed first tape 31 and second tape 48 are in the vicinity of one another, preferably in contact with one another.

The preformed first tape 31 is also in contact with the second roller 132. It advantageously lays on the second roller 132, such that the second roller 132 prevents the preformed first tape 31 from falling down under the effect of gravity.

The interspace 134 locally has a width, taken perpendicular to the rotation axes of the rollers 130, 132 greater than the sum of the thickness of the first tape and of the thickness of the second tape 48.

In the downstream joint profiling stages 126A, 126B, the successive rollers 130, 132 are able to jointly profile the first tape 31 and the second tape 48 such that the cross section of each of the first tape 31 and of the second tape 48 varies after passing the rollers 130, 132.

Figure 9:
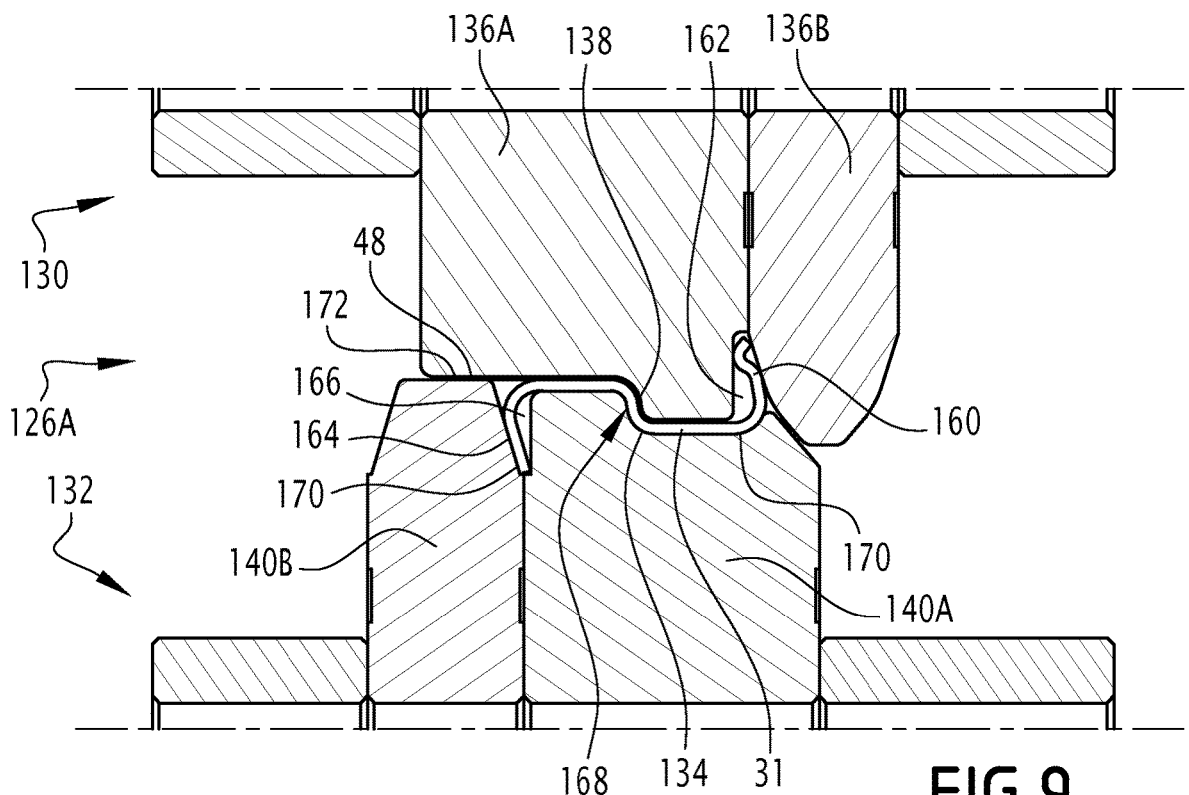
FIGS. 9 to 10 are views similar to FIG. 5 of profiling rollers of successive downstream joint profiling stages of the first tape and of the second tape in the machine of FIG. 3.
Figure 10:
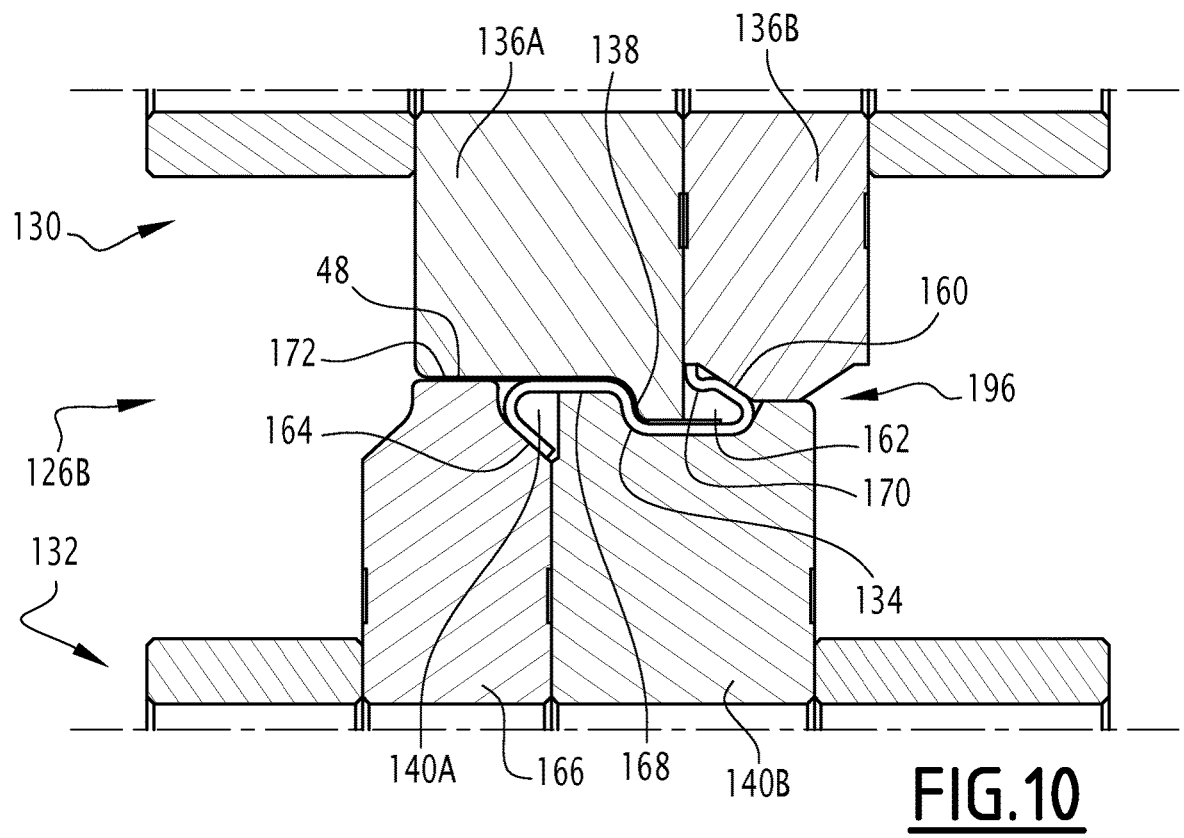

In the example of FIGS. 9 and 10, the first roller 130 again comprises a step 138, which is facing and apart the step 142 defined on the second roller 132. The step 138 is able to profile the second tape 48, to form an intermediate region 44 having a shape complementary to the shape of intermediate portion 34 of the first tape 31.

The first roller 130 also defines a lateral bending surface 160 delimiting a lateral groove 162 for continuing the bending the outer portion 36 of the first tape 31 comprising the supporting wave 38, without jointly bending the second tape 48.

The lateral bending surface 160 is here delimited on a disc 136B of the first roller 130. The groove 162 is delimited between the disc 136A and the disc 136B of the first roller 130.

Similarly, the second roller 132 delimits a lateral bending surface 164 for bending the inner portion 32 of the first tape 31, and a groove 166 for receiving the bent part of the inner portion 32.

The protrusion 138 is here formed on the first disk 136A. The lateral surface 164 is delimited on a lateral disc 140B of the second roller 132. The groove 166 is delimited between a first disc 140A and the disc 140B of the second roller 132.

Thus, the interspace 134 comprises a central region 168 in which a joint deformation of the first tape 31 and of the second tape 48 is carried out, in particular to form the tilted intermediate portion 34 of the first tape and the intermediate region 44 of the second tape 48.

The interspace 134 also comprises two regions 170 for deforming only the first tape 31 delimited by the grooves 162, 166, and a region 172 for maintaining the flat shape of the second tape 48, to form the inner region 46 of the second tape 48.

The first feeder 112 is configured to feed the first tape 31 to the upstream profiling stage 122A in order to pre-profile the first tape 31.

It comprises a first unwinder 180 around which the flat first tape 31 is rolled. The first unwinder 180 is here fixed on the opposite face 118 of the rotary support 106.

The first feeder 112 also comprises first guide rollers 182A, 182B, 182C which are able to guide the first tape 31 from the unwinder 180 and to twist it to align it with the profiling axis F-F' when entering the upstream profiling stage 122A.

The second feeder 114 comprises a second unwinder 184 and second guide rollers 186A, 186B, to feed the second tape 48 in the intermediate joining stage 124, as a flat tape.

The second guide rollers 186A, 186B are configured to change the direction of the local longitudinal axis of the second tape 48, without modifying its cross section, i.e. maintaining the second tape 48 as a flat tape.

Figure 4:
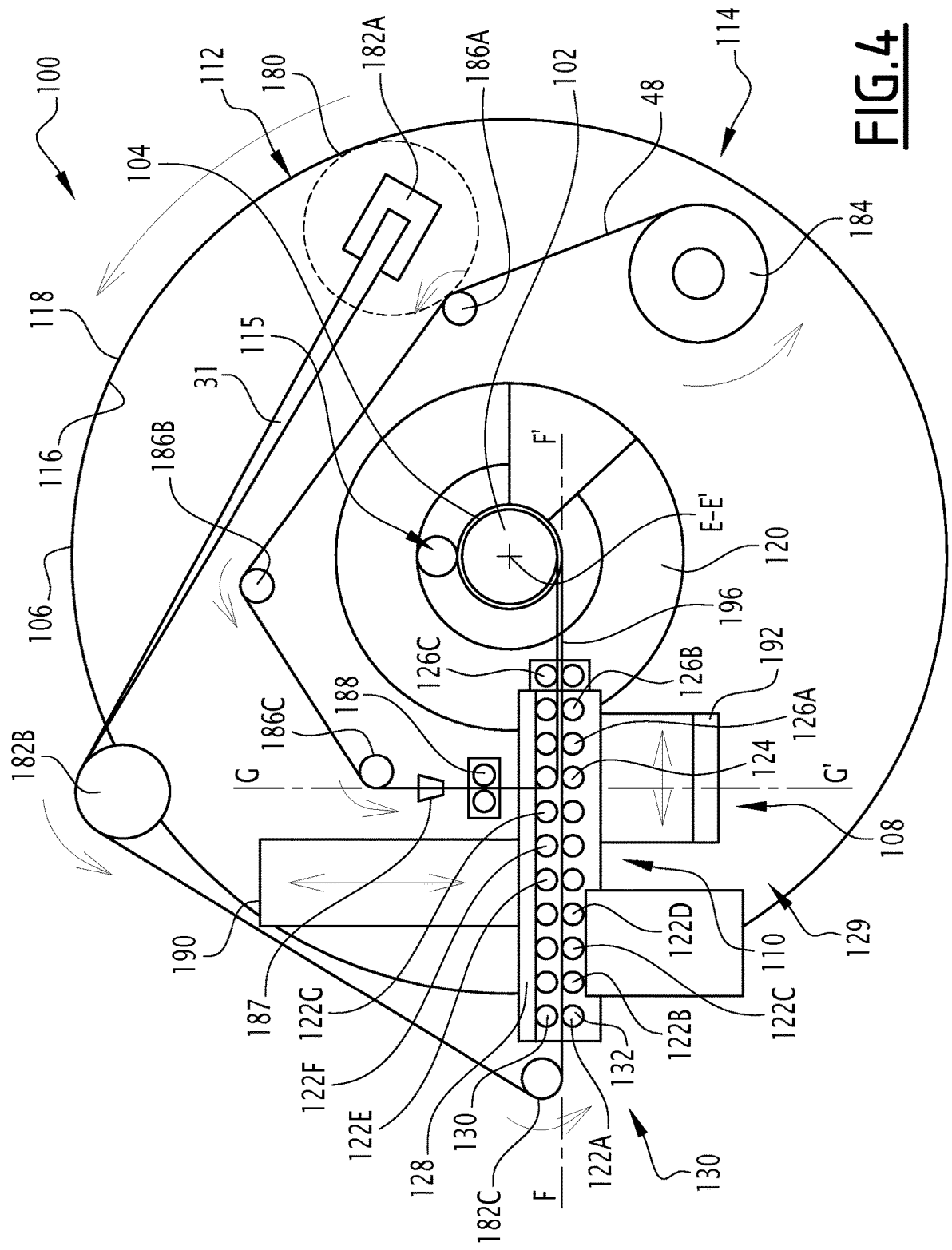
FIG. 4 is a front schematic view of a first machine for forming the carcass of FIG. 2 FIG. 2.

In the example of FIG. 4, the second feeder 114 further comprises a brake 187 to control the feeding speed of the second tape 48, and a pair 188 of aligning rollers, able to insert the flat second tape 48 into the intermediate joining stage 124, in a predetermined feeding direction G-G', non-parallel to the profiling axis B-B', in particular perpendicular to the profiling axis F-F'. The predetermined feeding direction G-G' makes an angle comprised between 45° and 135°, in particular 90° with the profiling axis F-F'.

The support body 128 holds the successive rollers 130, 132 of each stage 122A to 122G, 124, 126A to 126C in succession along the profiling axis F-F'.

The displacing device 129 comprises at least a transverse displacer 130 able to move the support body 128 and the profiling axis F-F' transversely with regard to the mandrel axis E-E', and an axial displacer 192 able to move the support body 128 along the profiling axis F-F'.

A method for manufacturing a tubular reinforcement 29 according to the invention will be now described.

When carrying out the method, the first feeder 112 is activated to unwind the flat first tape 31, to feed it to the upstream profiling stages 122A to 122G.

The first tape 31 is guided by the guiding rollers 182A, 182B, 182C, is advantageously twisted and aligned to make it parallel to the profiling axis F-F'.

Then, the first tape 31 runs through the successive upstream profiling stages 122A to 122G. It is progressively profiled in the successive interspaces 134 between the rollers 130, 132 of the successive upstream profiling stages 122A to 122G.

As shown in FIG. 5, in stages 122A to 122B, the first tape 31 is first bent in the stepped region 146 to form the intermediate portion 34 of the profiled first tape 31, the other portions of the first tape 31 remaining flat.

Then, as shown in FIG. 6, the supporting wave 38 is formed into the groove 150 of stage 122C. In the subsequent upstream profiling stages 122D to 122F, the edges of the first tape 31 are then progressively bent, as shown in FIG. 7.

Figure 7:
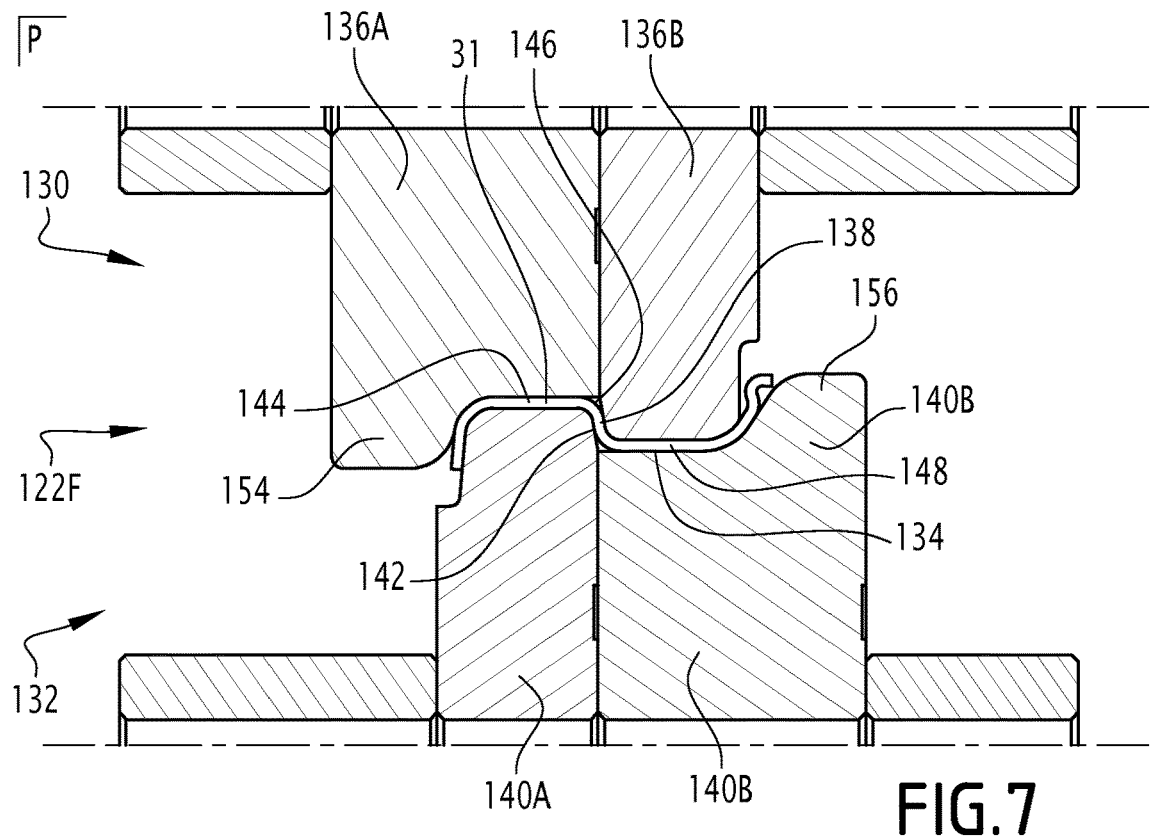

In FIG. 7, the lateral edges of the first tape 31 are now partially bent to define the inner portion 32 and the outer portion 36 with an open J-shape. The first tape 31 is therefore pre-profiled when it enters the intermediate joining stage 124.

Simultaneously, the second feeder 114 is activated to unwind the second tape 48 from the second unwinder 184. The second tape 48 runs along the rollers 186A, 186B, 186C to reach the brake 187 and the aligning rollers 188. It is then aligned along a feeding direction G-G' with a predetermined angle with the profiling axis F-F'. It remains a flat tape.

In the joining stage 124, the second tape 48 is fed as a flat tape and is aligned by contact with the flat zone 158 of the first roller 130 to be parallel to the profiling axis F-F'.

The pre-profiled first tape 31 is just supported on the second roller 132 to be placed facing the second tape 48.

The longitudinal local axis of the pre-profiled first tape 31 and of the flat second tape 48 are thus placed parallel to each other. The pre-profiled first tape 31 and the flat second tape 48 are in the vicinity of one another, preferably in contact with one another.

Then, in the downstream profiling stages 126A to 126C, the first tape 31 and the second tape 48 are jointly profiled, in the central region 168 of the interspace 134 between the rollers 130, 132. The intermediate region 44 of the second tape 48 and the intermediate portion 34 of the first tape 31, as well as the axial outer region of the first tape 36 and a segment of the outer portion 36 of the first tape 31 are profiled with complementary shapes, in contact with one another.

Moreover, in regions 170 of the interspace 134, in particular in the grooves 162, 166, the edges of the first tape 31 are deformed without deformation of the second tape 48, to adopt an open U-shape.

Finally, in region 172, the second tape 48 is kept flat to form the flat inner region 46 of the insert 28.

The combined profiled strip 196 which is obtained at the outlet of the profiler apparatus 110 is then fed to the outer surface 104 of the mandrel 102. The rotary support 106 is continuously rotated around the axis E-E' while the mandrel 102 is driven in translation along the axis E-E'.

The combined profiled strip 196 is then wound helicoidally around the surface 104, to form successive turns, with the desired pitch.

Simultaneously, the partly open outer portion 36 of each turn of the first tape 31 is inserted into the inner portion 32 of an adjacent turn, the outer region of the insert 28 being inserted between the outer portion 36 of the turn and the inner portion of the adjacent turn.

The inner region 46 of each turn of the second tape 48 is applied on the inner region 46 of an adjacent turn to close the gap 40 being formed between the successive turns of the first tape 31.

Radial applying members of the locking device 115 are then applied on the outside of the combined profile strip 196 to close and interlock the carcass 26 and the insert 28.

Once the tubular reinforcement 29 has been manufactured, the internal sheath 20 is formed around the carcass 26, for example by extrusion. The pressure vault 27 and the armor layers 24, 25 are then wound around the internal sheath 20. The external sheath 30 is then advantageously formed by extrusion while being positioned outside the layers of armor 24, 25.

Thanks to the machine 100 according to the invention, the method of manufacturing the tubular reinforcement 29 is simple to operate. The joint deformation of the first tape 31 and of the second tape 48 ensures a perfect fit between the tapes 31, 48 before the carcass 26 is interlocked. Moreover, the feeding of the second tape 48 as a flat tape in the joining stage 124 is simple to operate, and does not require a bulky arrangement.

The first feeder 112 for the first tape 31, the second feeder 114 for the second tape 48 and the profiler apparatus 110 are all fitted on the same rotary support 106, which simplifies the equipment needed to form the carcass 26 and reduces its bulkiness. The machine 100 is therefore particularly suitable for forming the carcass.

The second tape 48 is introduced very easily in the machine 100 by using a simple deflecting roller 130 of the joining stage 124. Machines used to profile only a first tape 31 can therefore easily be retrofitted to include a joining stage 124 for the second tape 48.

In a variant, a tubular reinforcement 29 is formed on an outer surface 104 delimited on an internal sheath of a pipe.

The invention claimed is:

1. A pipe tubular reinforcement forming machine, comprising:
    a first feeder, configured to unwind a first tape;
    a profiler comprising at least one upstream profiling stage configured to receive the first tape from the first feeder and configured to profile the first tape to form a pre-profiled first tape;
    a second feeder, configured to unwind a second tape, the second tape being a flat tape;
    an intermediate joining stage configured to receive the second tape as a flat tape from the second feeder and configured to join the pre-profiled first tape and the flat second tape; and
    at least one downstream profiling stage configured to jointly profile the first tape and the second tape received from the intermediate joining stage and to form a combined profiled strip,
    wherein the machine is without a profiler within the second feeder or between the second feeder and the intermediate joining stage such that the transverse section of the second tape remains constant in the second feeder, up to the intermediate joining stage,
    the at least one upstream profiling stage and the at least one downstream profiling stage each have at least two opposite rollers defining between them a profiling interspace, and
    the at least one downstream profiling stage has a profiling interspace that comprises,
        at least a first region configured to jointly deform the first tape and the second tape, and
        at least a second region configured to deform only the first tape, without deforming the second tape.

2. The machine according to claim 1, wherein the intermediate joining stage comprises at least a redirecting first roller configured to redirect the second tape from the second feeder to the at least one downstream profiling stage, the second tape remaining a flat tape, the intermediate joining stage comprising a second roller configured to support the pre-profiled first tape.

3. The machine according to claim 1, wherein the profiling interspace of the at least one downstream profiling stage comprises at least a third region configured to maintain the shape of a fourth region of the second tape.

4. The machine according to claim 3, wherein, in cross section in a plane containing rotation axes of the at least two opposite rollers, the third region is delimited by opposite flat zones, the second tape remaining flat in the third region.

5. The machine according to claim 1, wherein at least one of the at least two opposite rollers defines a lateral deforming surface for bending an edge of the first tape.

6. The machine according to claim 1, wherein the second feeder comprises a second tape unwinder, the flat second tape being rolled on the second tape unwinder, the machine comprising at least one second tape guiding roller configured to direct the second tape issuing from the second tape unwinder towards the intermediate joining stage.

7. The machine according to claim 6, wherein the second feeder comprises a brake to control the feeding speed of the second tape in the intermediate joining stage.

8. The machine according to claim 7, wherein the brake is interposed between the second tape unwinder and the intermediate joining stage.

9. The machine according to claim 6, wherein the second feeder comprises a pair of opposed alignment rollers to guide the second tape to the intermediate joining stage with a predefined feeding direction.

10. The machine according to claim 1, comprising a winder configured to helicoidally wind the combined profiled strip on a cylindrical outer surface to form the tubular reinforcement.

11. The machine according to claim 10, wherein the winder comprises a rotary support mounted rotatable around a winding axis defined by the cylindrical outer surface, the rotating table bearing the first feeder, the second feeder, and the profiler.

12. A pipe tubular reinforcement forming method comprising:
   unwinding a first tape from a first feeder;
   feeding the first tape from the first feeder to at least one upstream profiling stage of a profiler to form a pre-profiled first tape;
   unwinding a second tape from a second feeder, the second tape being a flat tape;
   feeding the second tape as a flat tape from the second feeder, without profiling, to an intermediate joining stage of the profiler and joining the pre-profiled first tape and the flat second tape in the intermediate joining stage;
   jointly profiling the first tape and the second tape received from the intermediate joining stage in at least one downstream profiling stage to form a combined profiled strip,
   the at least one upstream profiling stage and the at least one downstream profiling stage each have at least two opposite rollers defining between them a profiling interspace, and
   the at least one downstream profiling stage has a profiling interspace that comprises,
      at least a first region configured to jointly deform the first tape and the second tape, and
      at least a second region configured to deform only the first tape, without deforming the second tape.

13. The method according to claim 12, wherein the at least one upstream profiling stage and the at least one downstream profiling stage each has at least two opposite rollers defining between them a profiling interspace,
   the joint profiling of the first tape and the second tape in the at least one downstream profiling stage comprises jointly deforming the first tape and of the second tape in at least a first region configured to jointly deform the first tape and the second tape in the interspace and deforming only the first tape without deformation of the second tape in at least a second region configured to deform only the first tape in the interspace.

14. The method according to claim 12, comprising helicoidally winding the combined profiled strip on a cylindrical outer surface to form the tubular reinforcement.

15. A pipe tubular reinforcement forming machine, comprising:
   a first feeder, configured to unwind a first tape;
   a profiler comprising at least an upstream profiling stage configured to receive the first tape from the first feeder and configured to profile the first tape to form a pre-profiled first tape;
   a second feeder, configured to unwind a second tape, the second tape being a flat tape;
   an intermediate joining stage configured to receive the second tape as a flat tape from the second feeder and configured to join the pre-profiled first tape and the flat second tape; and
   at least a downstream profiling stage configured to jointly profile the first tape and the second tape received from the intermediate joining stage and to form a combined profiled strip,
   wherein the second feeder comprises a second unwinder and a second guide roller to feed the second tape in the intermediate joining stage as a flat tape, the second guide roller being configured to change direction of the second tape's local longitudinal axis, without modifying its cross section.

* * * * *